United States Patent Office 3,280,231
Patented Oct. 18, 1966

3,280,231
METHOD FOR MANUFACTURE OF LOW PERMEABILITY CARBONACEOUS PRODUCTS
Jacques Bentolila and Pierre Cornuault, Chedde, France, assignors to Pechiney-Compagnie de Produits, Chimiques et Electrometallurgiques, Paris, France
Filed Feb. 20, 1964, Ser. No. 346,200
Claims priority, application France, Feb. 20, 1963, 925,673
4 Claims. (Cl. 264—29)

This invention relates to carbonaceous products of low permeability and to the methods and compositions for use in the fabrication thereof.

Carbonaceous products have been produced by mastication of the mixture of such carbonaceous materials as coke, carbon black and possibly graphite with a carbonaceous binder such as pitch and wherein the mixture is formed into the desired product, as by compression molding or die extrusion, followed by subjecting the product to a heat treatment.

Carbon black, such as is obtained by partial combustion or thermal decomposition of gaseous or liquid hydrocarbons, is available as an industrial product in fine particle size, such as within the range of 0.5 to 0.005 micron. Additions of carbon black to the graphite or coke dust operates to increase the apparent density of the resulting carbonaceous product and/or to reduce the porosity of the product to very fine pores. However, processes wherein carbon black is used often result in breakage or cracking of the product during the heat treatment and such products are also deficient from the standpoint of permeability and/or mechanical strength and others of the mechanical properties.

These deficiencies can be alleviated somewhat by baking the product under pressure of nitrogen or by effecting several impregnations of the product but these steps complicate the process and are applicable only to relatively small articles.

The heat treatment that is applied also results in substantial shrinkage of the products in amounts which may rise to as much as 15% of the initial volume. Such shrinkage is usually accompanied by uncontrolled deformations, cracking and the like. In addition, the surfaces have also been found to retain granules of coke used in charging the furnace and these granules have to be removed after which the product is machined to the desired shape and dimension.

Thus the fabrication of carbonaceous products in the manner described has been limited to simple shapes, such as round bars or rods, especially in the production of products of high grade which are formed by drawing or extrusion. To the present, it has not been possible to fabricate such more complex products as large tubular members having fins and the like, especially when formed in one piece as by drawing or extrusion. Instead, it has been necessary to make use of complex processes for assembly and fabrication.

It is an object of this invention to produce and to provide a method for producing carbonaceous products of sound texture and of high density without the need for baking under nitrogen pressure or for impregnation and it is a related object to produce and to provide a method for producing carbonaceous products of complex shapes in one piece and of large size; which are characterized by exceptionally high strengths and other desirable mechanical properties; which are capable of withstanding temperatures in excess of 2600° C. without noticeable loss in mechanical properties; which result in a finished product of good dimension, shape and surface finish without the necessity to make use of the expensive finishing steps of the types heretofore required; and which are characterized by low permeability to liquids and gases.

These and other objects and advantages of this invention will hereinafter appear and for purposes of illustration, but not of limitation, embodiments of the invention are shown in the accompanying drawing in which.

Figure 1:
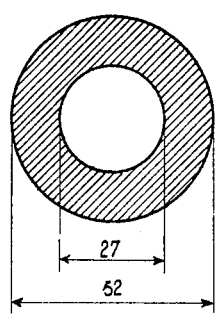
FIGS. 1 and 3 are sectional elevational views through a tubular member fabricated in accordance with the practice of this invention.

In accordance with the practice of this invention, a carbonaceous product of low permeability to liquids and gases and which achieves the objects heretofore described is fabricated by giving a definite shape, preferably by extruding, to a mixture of a carbonaceous binder and a basic carbonaceous material consisting essentially of finely divided graphite and previously graphitized carbon black having a particle size of 0.5 to 0.005 micron and which is present in amount of 10% to 50% by weight and preferably 25% to 50% by weight of the mixture, and in which any complement to make up 100% is made up of graphite dust having a particle size within the range of 0.5 to 400 microns.

To the best of applicants' knowledge, graphite powders having a particle size of less than 0.5 micron cannot be produced in amounts greater than 1% by known mechanical grinding techniques. In the attempt to produce a graphite powder containing more than 10% by weight of graphite having a particle size of less than 0.5 micron, it would be necessary to carry out a number of successive selective operations to increase the proportion of the finest particles in the ground product. This would result in a product of prohibitive cost and of little industrial value.

In accordance with the practice of this invention, best results are secured by the use of a carbonaceous binder selected of an organic condensation polymerization thermosetting resin, such for example as unbranched or medium-branched thermosetting resinous materials in a partially polymerized stage (prepolymer) and which is formed from at least one of the constituents such as an aldehyde, a phenol, an amine derivative, or preferably an unsaturated cyclic alcohol, such as furfural alcohol, and which may be further represented by such condensation thermosetting resins as phenol aldehyde resins, furfural alcohol resins, phenol furfural resins and the like known resinous materials.

In a system embodying the features of this invention, it has been found that the amount of binder can be unexpectedly reduced when previously graphitized carbon black is employed within the amount described instead of carbon black which has not been graphitized. Another surprising result from the use of previously graphitized carbon black is in the amounts of lesser pressure required for molding, as by pressure molding, or extrusion to final shape. Substitution of the previously graphitized carbon black for fine graphite powder of large dimension, such as within the range of 0.5 to 10 microns, gives rise to products having a lower apparent density and considerably lower strength and mechanical properties by comparison with products prepared in accordance with the practice of this invention.

It is desirable to maintain the amount of carbonaceous binder as low as possible consistent with the ability to mold the mixture by conventional pressure molding, such as by extrusion. When the article is molded by extrusion, the carbonaceous binder can be employed in an amount within the range of 180 to 230 parts by weight and preferably about 210 parts by weight per 1000 parts by weight of the basic carbonaceous material. Best results are secured when such molding operation by extrusion is carried out at a temperature within the range of about 40° to 70° C. although other temperatures may be used, depending upon the amount of pressure and the ratio of the components making up the mixture.

The prepolymer defined above may have an acid catalyst, added at the time of use.

When the graphitized carbon black is employed in the composition of this invention in an amount less than 10% by weight, products having the desired characteristics will not be obtained. On the other hand, when the basic carbonaceous material contains more than 50% by weight graphitized carbon black, a product is secured which has poor texture, notwithstanding the great amount of care taken in its manufacture.

The process of this invention is capable of a number of modifications which may be employed by way of improvements in the process or in the products formed thereby. For example, the product, after pressure molding, as by extrusion can be prebaked by heating to an elevated temperature which does not exceed 300° C., as by the use of an infra-red ray heater positioned at the outlet from the extrusion die and in endwise alignment therewith to provide a substantially continuous operation. Advantageous results can also be secured when the extruded product, with or without preheat, is baked and then preferably graphitized. In some instances, the baking and the graphitization can be carried out in the same furnace, without intermediate cooling, in a process which is referred to as "direct graphitization," especially when the process is carried out in connection with continuous extrusion.

The concept of this invention enables the production of products of large or of small dimension and the production thereof with sound texture and high density. Breakage, cracking, distortions or deformations of the type heretofore experienced by reason of the heat treatment are virtually eliminated by the process embodying the features of this invention.

Considerable improvement, especially from the standpoint of cost, is secured by the practice of this invention since heat treatment to temperatures as high as 2700° C. does not operate to destroy the smoothness and the appearance of the surface thereby to obviate the need for machining. The amount of shrinkage is also reduced to an insignificant figure of about 3% to 6% with a maximum of about 9% of the initial volume of the raw product thereby to enable the product to be molded to final shape, such as in the extrusion of round bars, plates, strips, tubular members, tubular members with fins, and the like, taking into consideration the amount of shrinkage in mold design.

Figure 5:
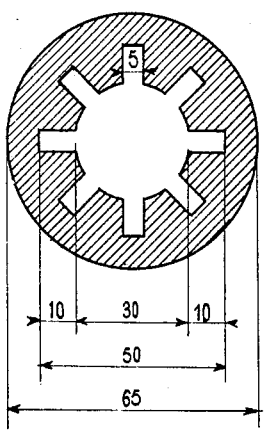
FIG. 5 is a sectional elevational view through a modification in a tubular member fabricated in accordance with the practice of this invention.
Figure 6:
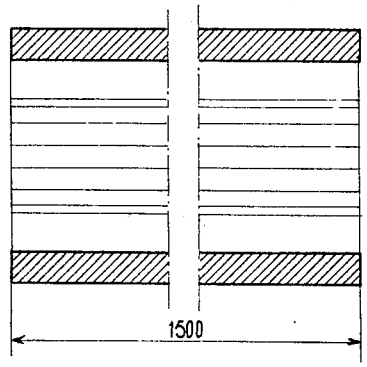
FIG. 6 is a longitudinal sectional view of the tubular member of FIG. 5.

Carbonaceous products of complex shapes in cross-section can be extruded in one piece, such for example as in the extrusion of tubular members having internal axial fins, as in the extrusion of T-shaped members, L-shaped members, I-shaped members, or tubular members having internal or external grooves, as illustrated in FIGS. 5 and 6.

The products obtained may be referred to as blanks which are sufficiently developed to be used as is or, where close tolerances are required, only a minor finishing step will be required. Thus the process of this invention operates materially to simplify the manufacture of carbonaceous or graphite products of sound texture and of good dimension. Products can be obtained having a high apparent density of from about 1.85 to about 1.96 and a low permeability as represented by less than about $10^{-6}$ cm.$^2$/s. for raw and prefired products; about $10^{-5}$ cm.$^2$/s. for fired products, and $10^{-4}$ cm.$^2$/s. for the graphitized products of this invention. The porosity of the graphitized products, when measured by a mercury porosimeter, under a pressure of 1000 kg./cm.$^2$, does not exceed 6% and the size of the pores is dimensioned generally in the range of 0.1 to 0.5 micron, and more particularly 0.1 to 0.2 micron.

The mechanical properties of products obtained by the practice of this invention are high, having a compression strength of more than 450 kg./cm.$^2$ and even more than 500 kg./cm.$^2$ and a modulus of elasticity (Young modulus) in the order of and more than 1400 to 1500 kg./cm.$^2$.

The invention includes not only the new products per se which are prepared in accordance with the practice of this invention but the new and novel uses which can be made of the new and improved products of this invention.

The products manufactured to embody the concepts of this invention may advantageously be used as carbonaceous materials of very low permeability for chemical engineering applications, such for example as a material having chemical corrosion resistance, for heat exchangers, for the manufacture of bricks, various coatings, pipe systems and the like, the materials being adapted to preserve particularly low permeability at temperatures up to 300° C. The carbonaceous products of this invention may also be used to advantage in nuclear engineering, such for example as in the fabrication of jackets or sheets for the fuel elements of nuclear reactors, for the manufacture of reactors with molten or dissolved salts or in molten metal reactors, and the like. They are also suitable for making elements of rockets, such as cones, for re-entry into the atmosphere, for the manufacture of pipes, for the manufacture of keys used in electrodes employed in steel manufacture and, generally speaking, applications requiring high mechanical strengths and properties at high temperatures such as in excess of 2600° C.

Figure 2:
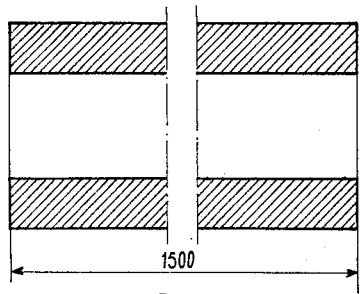
FIGS. 2 and 4 are sectional elevational views taken axially through the tubular members of FIGS. 1 and 3, respectively.
Figure 3:
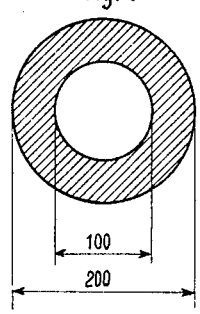
Figure 4:
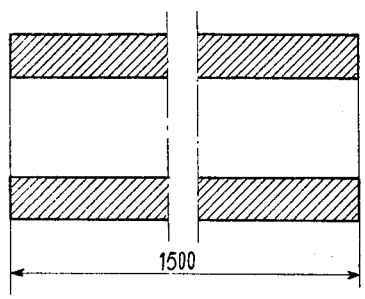

Referring now to the drawing, illustration is made of three graphite articles fabricated to embody the features of this invention. FIGS. 1 and 2 show in cross-section a tubular member having an external diameter of 52 mm., an internal diameter of 27 mm. and a length of 1500 mm. In FIGS. 3 and 4, the tubular member has an external diameter of 200 mm., an internal diameter of 100 mm. and a length of 1500 mm. In FIGS. 5 and 6 illustration is made of a corrugated tube having an external diameter of 65 mm. and an internal diameter of 30 mm. It is formed with eight longitudinal grooves having a depth of 10 mm. and uniformly spaced peripherally about the internal surface and it is dimensioned to have a length of 1500 mm.

The following examples will illustrate the fabrication of carbonaceous products of this invention and such examples are given by way of illustration, but not by way of limitation.

*Example 1*

A mixture is formed of 60% by weight ground electrographite of from 1 to 200 microns in dimension and 40% by weight of previously graphitized carbon black. The mixture is worked cold into 210 parts by weight commercial furfural alcohol polymer in a precured stage and having a viscosity of about 7 poises and containing 5% by weight of acid catalyst such as hydrochloric acid. The resultant paste is placed in an extrusion press in which the nose piece of the die, having a diameter of 53 mm., is heated to a temperature of about 50° C. The cylindrical heated piston exerts a pressure of about 217 kg./cm.$^2$ on the paste. Its inner face carries a pin having a diameter of 27.6 mm. The material is extruded in about 6 minutes.

The extruded product, having an apparent density of 1.935, is placed in a graphitization furnace where it is baked at a rate initially to raise the temperature 6° to 8° C. per hour till a temperature of about 800° C. is reached, after which the fire rating is increased to about 50° C.

per hour until a temperature of about 2700° C. is reached. A tube thus graphitized, illustrated in FIGS. 1 and 2, is ready for use after cooling.

The coke granules used for charging the furnace do not adhere to the internal surfaces of the tube. Thus the tube retains a smooth appearance which it acquired on leaving the extrusion die. The dimensions of the graphitized article are substantially the same as the ones which it had on leaving the die except for a uniform contraction of about 2% in its linear dimension. The 2% contraction is taken into consideration in the design of the die and pin so that no further machining is required to give the graphitized article the desired dimensions for use.

*Example 2*

The die used for extrusion has a nose piece of 204 mm. in diameter and is employed with a heated piston having a front face which carries a cylindrical pin of 102 mm. in diameter. The process is carried out as in Example 1 with a composition prepared in accordance with the teachings of Example 1 to produce a graphitized tubular member, shown in FIGS. 3 and 4, having the same characteristics as the tubular member produced in Example 1.

*Example 3*

Use is made of the composition of Example 1 extruded through a die having a nose piece of 66.3 mm. and equipped with a heated piston in which the internal face carries a cylindrical pin of 30.6 mm. in diameter. The pin carries 8 moldings dimensioned to have a width of 5.1 mm. and a height of 10.2 mm.

By operating otherwise as in Example 1, it becomes possible to obtain an article having the shape shown in FIGS. 5 and 6. It has been virtually impossible to make a graphite object of this cross-section in one piece by processes which have heretofore been employed and the one piece tubular member of FIGS. 5 and 6 can be used with very little, if any, additional finishing operations applied.

Tables 1 and 2 set forth the various characteristics of the graphitized products obtained in Examples 1, 2 and 3.

TABLE I

|  | Contraction, percent | Appearance | Apparent density | Permeability | Open Porosity, percent |
|---|---|---|---|---|---|
| Ex. 1 | 7 | Smooth | 1.91 | $6.10^{-5}$ | 6 |
| Ex. 2 | 7.5 | ---do--- | 1.92 | $2.10^{-5}$ | 5 |
| Ex. 3 | 4.5 | ---do--- | 1.89 | $9.10^{-5}$ | 6 |

TABLE II

[Measurements taken parallel with grain]

|  | Coefficient of Heat dilation/° C. | Resistivity | Resistance to Compression, kg./cm.$^2$ | Modulus of elasticity |
|---|---|---|---|---|
| Ex. 1 | $2.9\ 10^{-6}$ | $1.95\ 10^{-3}$ | 520 | 1.500 |
| Ex. 2 | $2.7\ 10^{-7}$ | $1.87\ 10^{-3}$ | 490 | 1.450 |
| Ex. 3 | $2.7\ 10^{-6}$ | $1.93\ 10^{-3}$ | 510 | 1.560 |

In the foregoing tables, the term "contraction" relates to the reduction in volume of the graphitized article as compared to the raw product prior to heat treatment. The "appearance" refers to the surface after graphitization. The term "permeability" refers to the permeability to gases in cm.$^2$/s. Resistivity is expressed in ohms./cm. Resistance to compression is resistance to compression on breakage given in kg./cm.$^2$. Modulus of elasticity is expressed in kg./mm.$^2$.

It will be understood that changes may be made in the details of construction, processing and use without departing from the spirit of the invention, especially as defined in the following claims.

We claim:

1. In a process for the manufacture of carbonaceous products having low permeability to liquids and gases, the steps of forming to the shape of the desired product a mixture of a carbonaceous binder and a carbonaceous material in which the carbonaceous material consists essentially of graphite dust of a particle size between 0.5 and 400 microns and previously graphitized carbon black of a particle size between 0.5 and 0.005 micron, said graphitized carbon black making up 10% to 50% by weight of the carbonaceous material and baking the shaped product.

2. The process as claimed in claim 1 in which the carbonaceous binder is an organic thermosetting resinous polymer in a partially polymerized stage in which the carbonaceous binder is present in the ratio of 18:23 parts by weight of binder per 100 parts by weight of the carbonaceous material, and in which the forming of said mixture is carried out by extrusion.

3. The process as claimed in claim 1 in which the product is formed by extrusion and in which the extruding to the desired shape is effected while at a temperature within the range of 40° to 70° C.

4. In a process for the manufacture of carbonaceous products having low permeability to liquids and gases, the steps of forming to the shape of the desired product a mixture of a carbonaceous binder and a carbonaceous material in which the carbonaceous material consists essentially of graphite dust of a particle size between 0.5 and 400 microns and previously graphitized carbon black of a particle size between 0.5 and 0.005 micron, said graphitized carbon black making up 10% to 50% by weight of the carbonaceous material, baking the shaped product and graphitizing the product.

References Cited by the Examiner

UNITED STATES PATENTS

| 2,997,744 | 8/1961 | Stoddard et al. | 264—29 |
| 3,124,625 | 3/1964 | Sheinberg et al. | 264—29 XR |
| 3,126,430 | 3/1964 | Price | 264—29 |

FOREIGN PATENTS 656,694  1/1963  Canada.

ROBERT F. WHITE, *Primary Examiner.*

J. A. FINALAYSON, *Assistant Examiner.*